United States Patent
Baratakke et al.

(10) Patent No.: US 8,375,123 B2
(45) Date of Patent: Feb. 12, 2013

(54) REMOTE SESSION MANAGEMENT

(75) Inventors: Kavitha V. Baratakke, Austin, TX (US); Nikhil Hegde, Austin, TX (US); Sivakumar Krishnasamy, Bangalore (IN); Rashmi Narasimhan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 12/773,271

(22) Filed: May 4, 2010

(65) Prior Publication Data
US 2011/0276697 A1    Nov. 10, 2011

(51) Int. Cl.
*G06F 15/16* (2006.01)
(52) U.S. Cl. ............................................. 709/224
(58) Field of Classification Search ................. None
See application file for complete search history.

(56) References Cited

U.S. PATENT DOCUMENTS

| 4,885,789 | A | * | 12/1989 | Burger et al. ............... 713/164 |
| 7,036,010 | B2 | | 4/2006 | Wray |
| 7,467,192 | B1 | | 12/2008 | Lemler et al. |
| 7,467,372 | B2 | | 12/2008 | Loughlin et al. |
| 2001/0047417 | A1 | * | 11/2001 | Hartmann et al. ......... 709/227 |
| 2003/0135644 | A1 | * | 7/2003 | Barrett ..................... 709/238 |
| 2007/0130346 | A1 | | 6/2007 | Xie et al. |

* cited by examiner

*Primary Examiner* — Scott Christensen
(74) *Attorney, Agent, or Firm* — David Mims; Robert C. Rolnik

(57) ABSTRACT

Provided is reporting session information for a session upstream from a server. A data processing system receives a session handshake from a first client for a session between the server and the first client. The system receives a session-descriptor for a session between a second client and the first client before handling a nested session. The system determines whether a user has made an upstream session request. The system obtains session data from an upstream data structure, responsive to a determination that the user has made an upstream session request. The system renders the session data based on the upstream session request.

25 Claims, 5 Drawing Sheets

REMOTE SESSION MANAGEMENT

BACKGROUND OF THE INVENTION

1. Field of the Invention

The present invention relates generally to a computer implemented method, data processing system, and computer program product for communicating between three or more data processing systems. More specifically, the present invention relates to setup and tear-down of one or more sessions that are linked in a chain or otherwise nested.

2. Description of the Related Art

Computer networks enable multiple computers to work cooperatively to solve problems. A user may be seated at a computer at one location in a network, yet need to use resources of a second computer at another place in the network. To solve this problem, computer scientists built a number of client and server applications that can establish a session between two computers using a network, such as, for example, the Internet.

A remote access session or session is a state-aware connection between a client executed by a data processing system and a server executed by a processing system. The session begins with the stages or authentication and interactive mode. In these stages, the client provides identity and/or authentication information, as well as coordinates terminal settings and other user-specific conventions or options that will be observed in the session in-chief. The session can apply the protocol rules using, for example, secure shell (ssh), remote login (rlogin) and telnet, among other session protocols.

A user may use a session between his computer's client and a server to operate as a platform for yet another session to a second server. Accordingly, the user may execute a telnet command local to the first server, but specifying, as a target, the second server. The first server executes the telnet command and behaves as a client in relation to the second server during the second session. Meanwhile, the second server may receive requests from the first server. Consequently, the second server may act as a server for the first server during the second session. If the client computer is labeled 'X', the first server labeled 'A' and the second server labeled "B", the sessions can simply be described as follows. First, X connects to A to form the first session. Second, A connects to B to form the second session.

The arrangement of using the resources of a remote computer to establish second sessions to extend the reach of the client is called nested remote access sessions (NRAS). As described earlier, the session protocol selected may include, for example, rlogin, telnet and ssh. Conventional sessions record a TCP protocol control block or PCB to the data processing system that hosts the session. The PCB is a five field block that records the following data: source Internet protocol (IP) address, source Transport Control Protocol (TCP) port, destination IP address (IP address of the data processing system that acts as server for the session), destination Transport Control Protocol (TCP) port, and the address of the protocol control block.

A nested remote access session delivers a user's keystrokes first to the first session computer or first server. Next, the first server relays the user keystrokes to the second server, and so on through additional remote sessions. A query made by the user that requests the IP addresses involved in the session causes the most remote server in the NRAS chain to respond only with information present in the PCB of that remote server. Accordingly, the most remote server can access the IP addresses concerning only the most remote session. In the example given above, such a query can develop only the information of the A-to-B session, but not the information of the X-to-A session. This outcome results from the most remote server accessing its local PCB containing information about the A-to-B session.

Accordingly, an improvement over the existing situation is desired.

SUMMARY OF THE INVENTION

The present invention provides a computer implemented method, data processing system, and computer program product for reporting session information for a session upstream from a server. A data processing system receives a session handshake from a first client for a session between the server and the first client. The system receives a session-descriptor for a session between a second client and the first client before handling a nested session. The system determines whether a user has made an upstream session request. The system obtains session data from an upstream data structure, responsive to a determination that the user has made an upstream session request. The system renders the session data based on the upstream session request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
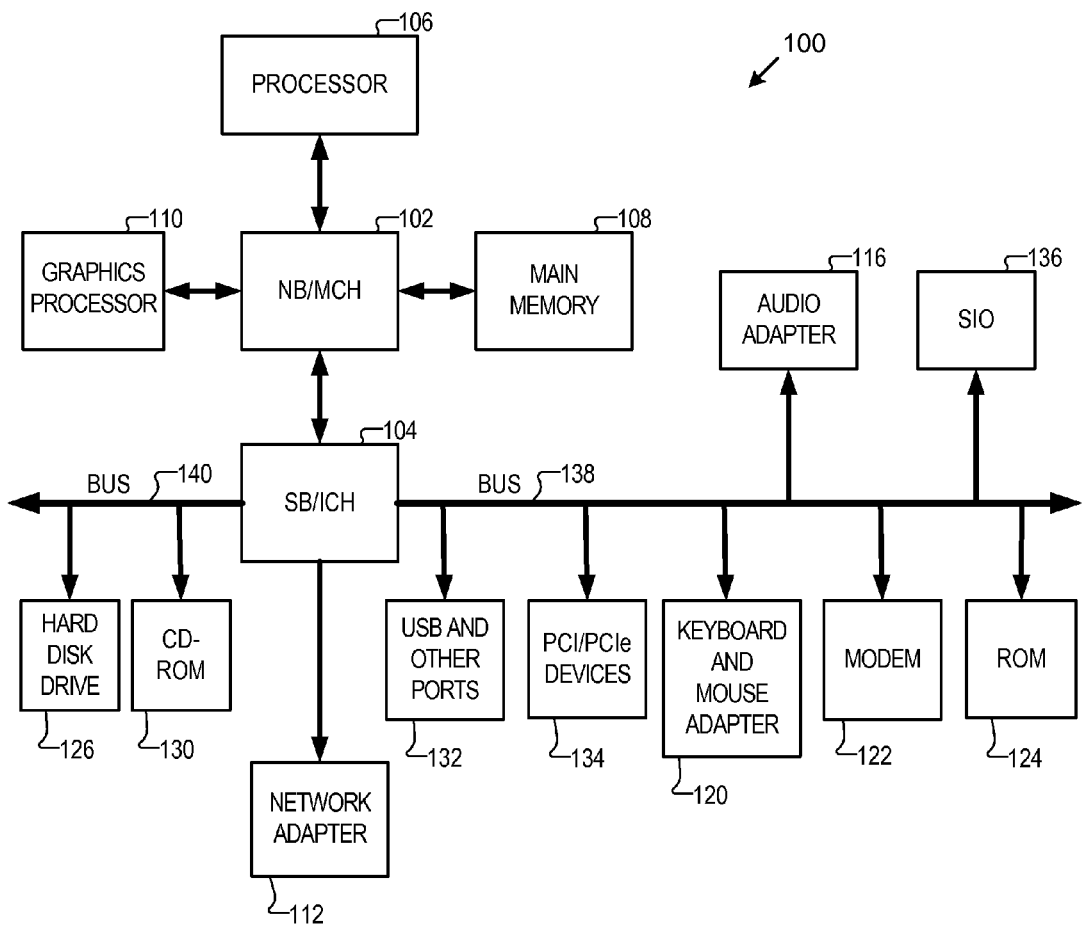
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
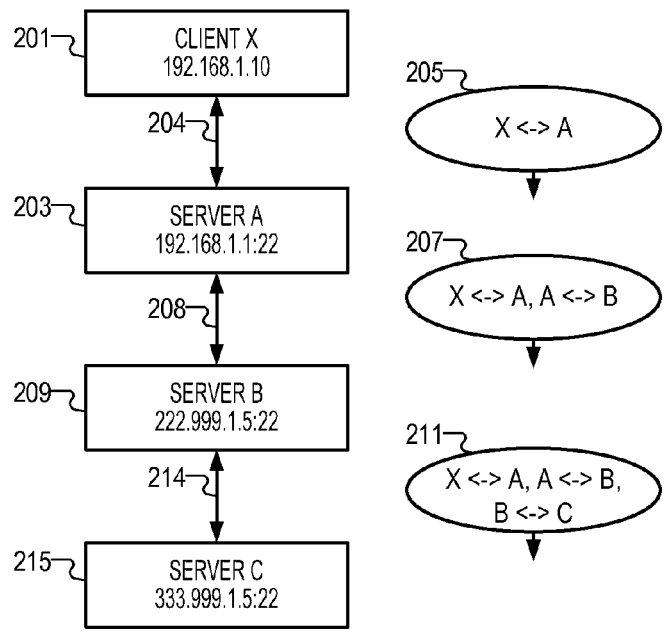
FIG. 2 is a block diagram of nested sessions in accordance with an illustrative embodiment of the invention.

FIG. 2 is a block diagram of nested sessions in accordance with an illustrative embodiment of the invention. Client X 201 connects to Server A 203 via a session symbolically illustrated as X<->A 205. The arrow on symbolic session X<->A 205 indicates a downstream direction in the chain of sessions. A client is upstream from a data processing system that operates as a server with respect to the session. Similarly, the server is downstream from the data processing system that operates as a client with respect to the session.

Server A 203 may be commanded to establish a session to server B 209 which is symbolized as X<->A, A<->B 207. Similarly, Server B 209 may be commanded to establish a session to server C 215, symbolized by X<->A, A<->B, B<->C 211. Accordingly, session links can permit data originating at client X 201 to be relayed to server C 215. The data may traverse session 204, session 208, and session 214. In contrast, the interactive responses from server C 215 traverse the links in the following order: first session 214; then session 208, and then session 204. Although Server A 203 is a data processing system that is a server to client X 201, it is appreciated that Server A 203 can occupy the position of client with respect to downstream servers, such as Server B 209. A client is an application that is executed on a data processing system in a manner that allows the client to asynchronously make requests or commands to an application, usually resident on a second data processing system. Similarly, a server is an application that is executed on a data processing system in a manner that allows the data processing system to respond to requests or commands of another data processing system.

In the configuration shown in FIG. 2, a user seated at client X 201 interacts with a shell provided from server C 215. In other words, all interactions, with the exception of queries as to the session path and requests to terminate, rely on Server A 203 and Server B 209 as intermediaries, while server C 215 provides the feedback and functionality to client X 201. To establish the configuration of sessions, the user conventionally relies on telnet, ssh, or rlogin, among others, to set session 204. At each step, the most remote host or server provides a shell to interactively respond to user-entered commands. Then, the user establishes session 208. Finally, the user may establish session 214.

The illustrative embodiments permit a user to query within a shell hosted at a remote host, for example, server C 215, to determine the number and details of intermediate sessions used to reach the remote host. This query benefits from two methods for reporting session data. First, for each successive link in a chain of sessions, each predecessor or upstream session can report upstream session data to a new server added to the chain of sessions. Secondly, when a chain of sessions has matured, the user can recall from the most remote host or server, the aggregate upstream data from the earlier steps in the chain. Thus, reports initially flow downstream to the most remote server, and then later, upon the user's request or query, reports flow upstream. The remote server directs such reports concerning at least one chain of sessions back to the user making the inquiry.

In addition, illustrative embodiments may permit a user to exit from multiple such sessions by stacking or relaying requests to terminate in a manner that the remote host communicates to one or more upstream data processing systems the request made to the most remote shell. Accordingly, a user can close as many intermediate sessions as desired in a single command and have a clearer idea of which host will provide the shell at the conclusion of the one or more requests to terminate.

Figure 3A:
FIG. 3A is a description of the structure of a session descriptor in accordance with an illustrative embodiment of the invention.

FIG. 3A is a description of the structure of a session descriptor in accordance with an illustrative embodiment of the invention. A session descriptor is a data structure that stores details concerning a server-hosted session between client and server. The session descriptor may be stored at the server. Accordingly, a local session descriptor is a data structure that stores the client information and the server information at the server. The session descriptor may include a five field structure having a protocol control block fields. The session descriptor fields may include a source internet protocol address, a source transport control protocol (TCP) port number, a destination internet protocol (IP) address, and a destination TCP port number. In addition the session descriptor may have a reference or pointer that may point to any upstream session descriptors. Accordingly, the first two fields can be combined in client IP address and port number 301. Similarly, the destination-related fields can be combined in server IP address and port number 303. Finally, the pointer or address may be link to a session descriptor 305. In other words, the session descriptor can be associated with another session descriptor. An association with at least one additional session descriptor, and the use of a pointer, is one way to create such an association. Initially, where a session is established without an upstream session, link to session descriptor 305 may be null. Many fields in the session descriptor may be the same as in a transport control protocol protocol's protocol control block (PCB). A PCB can provide many fields for the session descriptor.

Figure 3B:
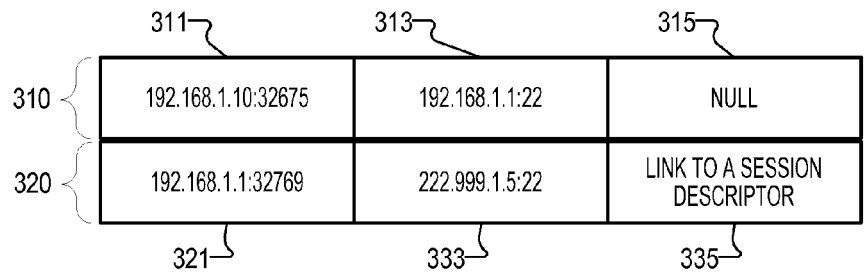
FIG. 3B is an example of data stored in a session descriptor in accordance with an illustrative embodiment of the invention.

FIG. 3B is an example of data stored in a session descriptor in accordance with an illustrative embodiment of the invention. Session descriptors depicted here may depict the links 204, and 208 of, for example, FIG. 2. Accordingly, client IP (or source) address and port number 311 may be 192.168.1.10:32675, wherein the colon separates the IP address from the port number. Similarly, the server IP address and port number 313 may be 192.168.1.1:22. Again, a colon may separate the IP address from the port number. Since session 204 lacks an upstream session, link to session descriptor 315 may be null.

Similarly, session 208 is associated with a session descriptor including client IP address and port number 321, server IP address and port number 333 and link to a session descriptor 335. In this case, however, the link to the session descriptor may be a link that points to the session descriptor for session 204. It is appreciated that the structures other than linked lists may be used in lieu of the session descriptors. Accordingly, a table of session descriptors may be used to show the relationship and order between session descriptors that are combined to form a nested remote access session. The combination of session descriptors as described in FIG. 3B forms a linked order data structure. Thus, a linked order data structure is a collection of session descriptors that are arranged so that they may be traversed in order.

In the session descriptor 310 and session descriptor 320, the relative positions of server A 203 are reversed. Initially, in session descriptor 310 the server A 203 is in the position of server or host. However, in session descriptor 320, server A 203 occupies the position of client with respect to the corresponding session 208. It should be noted that additional session descriptors (not show) may be added indefinitely to depict session 214 and any further sessions that a user may add to extend the chain of nested remote access sessions.

A nested session is a session between a client and a server, where the client is itself reached by a session from a second client. As such the first client may be a server in the case where it operates as a common end-point to the first session and a second session, which is upstream from the first session. The second session may be one requested by another client as, for example, a predecessor leg or first leg to a series of sessions leading to the session.

Figure 4:
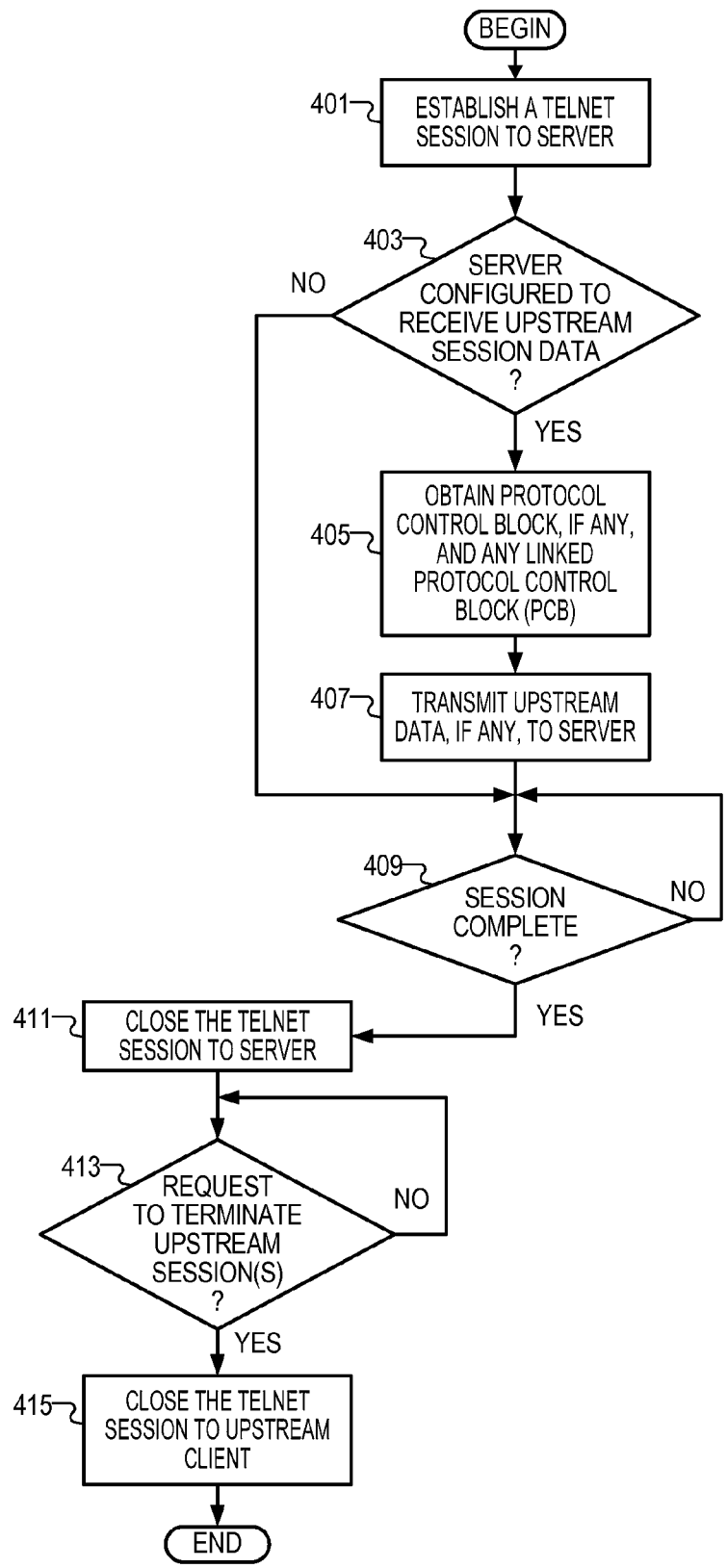
FIG. 4 is a flowchart of steps performed at a data processing system occupying a client position in a session.

FIG. 4 is a flowchart of steps performed at a data processing system occupying a client position in a session. Although the example, below, shows a telnet session as the session established and later closed, it is appreciated that other sessions may be substituted for the telnet session and accordingly for one or more links in a chain of nested remote access sessions. Initially, a client may establish a telnet session to a server (step 401). The client can be, for instance, server A 203 of FIG. 2. Similarly, the client may be establishing the telnet session to a server such as, for example, server B 209 of FIG. 2.

Next, the client may determine whether the server is configured to receive upstream session data (step 403). One or more session descriptors can form upstream session data. Thus, being configured to receive upstream session data, can be being configured to receive session descriptors, which can be a linked order data structure describing a chain of sessions. If the client determines that the server is configured to receive upstream session data, the client may obtain session descriptor, if any, as well as any linked session descriptors (step 405). In this case, the session descriptor may be a single unlinked session descriptor to session 204 of FIG. 2. In all cases, the upstream session data at least includes a local session descriptor. A local session descriptor is the session descriptor that describes the link in which the data processing system occupies the server position. In other words, the local session descriptor is the session descriptor available to the data processing system when a client is connected to the data processing system via a session.

The session descriptor forms the upstream data with respect to the client's link to server B 209. Accordingly, the client may transmit the upstream data to the server (step 407). Transmitting the upstream data may be performed provided there is a local session descriptor for the client. Next, the client may determine whether the session is complete (step 409). The session, of course, is the session from client to server, as set up at step 403. If the determination at step 403 is negative, then step 409 is also performed by client. A typical result can be that the session is not complete, the client repeats step 409.

At some point the session is complete, and the positive branch from step 409 is taken by client. The client may then terminate or close the telnet session to the server (step 411). Next, the client may determine if a request to terminate upstream sessions occurred (step 413). The request to terminate can be a request that occurs contemporaneously with the determination that the session is complete. In other words, the server may have requested to terminate the session, and before or after the request to close the session, the server may have made a request to terminate the upstream session or sessions. Although the server may make the request to terminate, the origin of the request to terminate the session can be the remote-most client in the chain, in this case, client 201 of FIG. 2. Accordingly, the request to terminate can be a responsive request issued from the server that hosts the session recently closed, for example, at server B 209. A negative determination at step 413 can cause one or more loops to re-evaluate whether a request to terminate upstream sessions has been received. In addition, it is appreciated that a time-out may be placed in the loop to detect when a reasonable time has elapsed after closing the session, and exit from such a loop of non-receipt of request-termination-of-upstream-sessions.

However, a positive determination at step 413 may cause the client to close a telnet session to an upstream client, for example, client X 201 of FIG. 2. Processing may terminate thereafter.

Figure 5:
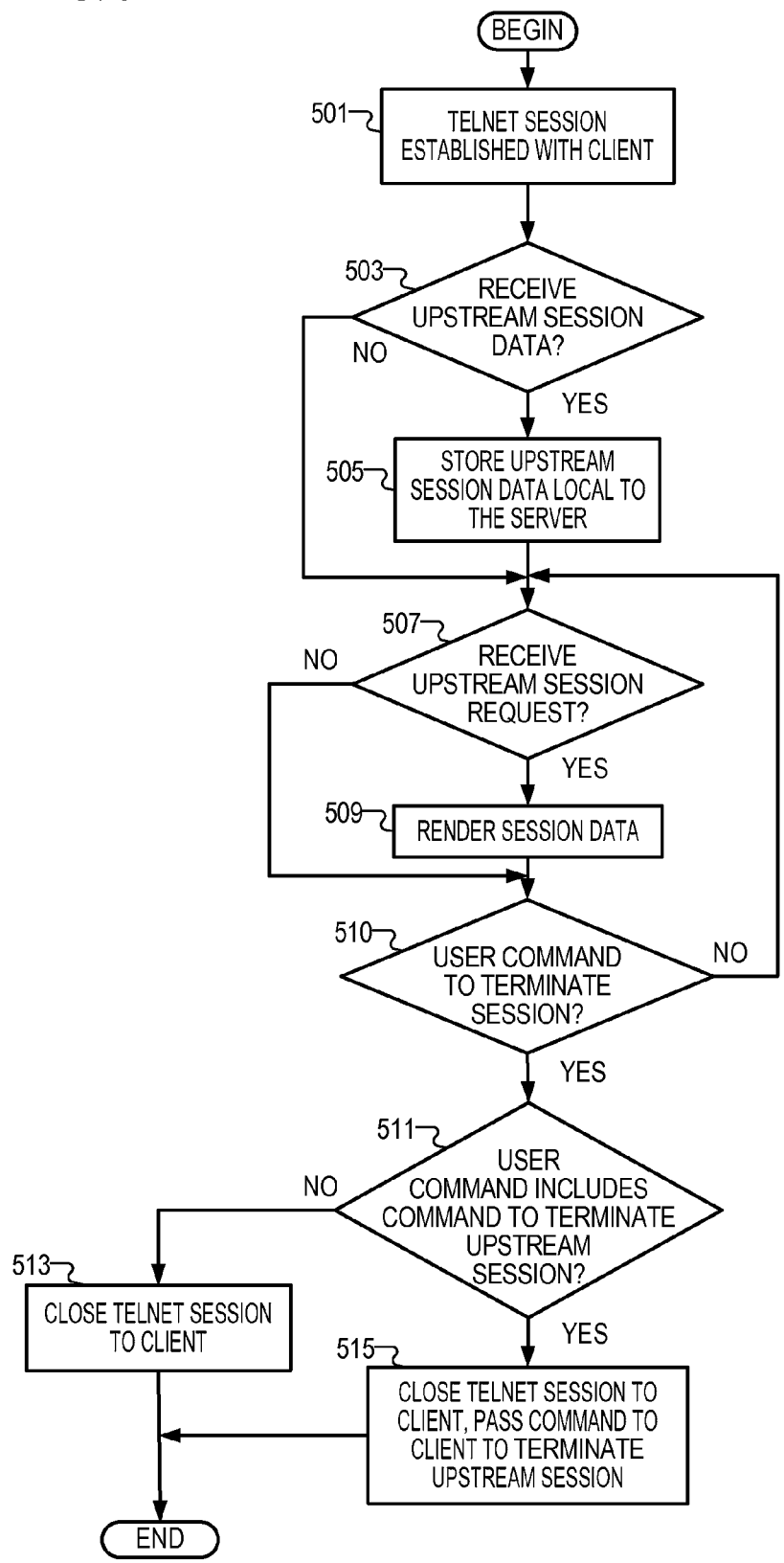
FIG. 5 is a flowchart performed at a data processing system occupying a server position in a session.

FIG. 5 is a flowchart performed at a data processing system occupying a server position in a session. Initially, the server may establish a telnet session with a client (step 501). As part of step 501, the server may receive a session handshake from the client. A session handshake is a negotiation of terms by which the client will exchange information with the server during the session. The session handshake can include forming a session descriptor from information arriving from the client. For example, the server can receive the source or client IP address and port number as part of the handshake.

Next, the server may receive upstream session data. If so, the server may determine that it has received upstream session data (step 503). The upstream session data step can include receiving a session descriptor for a session between a second client and the client in the step-501-established session. A negative determination may result in the server skipping to step 507. However, a positive result at step 503 can result in the server storing the upstream session data local to the server (step 505). Now, the server may handle the current session transport of data from a user and feedback from the applications at the server. Next, the server may receive a request to display upstream session data (step 507). Such a request can be a determination whether a user has made an upstream session request. An upstream session request is a request originating from a data processing system, where the data processing system is a client to a server hosting the session through which the upstream session request arrives. The upstream session request requests details concerning all sessions that link the user's client data processing system to the server hosting the session through which the upstream session request arrives. A negative determination at step 507 may result in the server skipping to step 510.

Responsive to a positive determination that the user has made an upstream session request, the server may render the session data from an upstream data structure (step 509). The upstream data structure may be, for example, a session descriptor, for example as provided in step 503. The rendering of the upstream session data is described further in relation to FIG. 6, below.

Next, the server may determine whether it has received a user command to terminate the session (step 510). The user command may be any command commonly used by telnet, ssh, or rlogin, including, for example, the fast exit command, composed of one or more tildes and a dot, that is, the tilde-dot command (~.). A negative determination may cause the server to repeat performing step 507.

On the other hand, a positive determination to exit, can cause the server to determine whether the user command includes a command to terminate an upstream session (step 511). A command to terminate an upstream session is a signal to the server to propagate the termination to the client in order to terminate the client's session with the data processing system that operates as a client to the client. A user command will include a command to terminate an upstream session where, for example, the tilde appears twice, for example, '~~.'. In response to a positive determination, the server can close the telnet session to client and pass the command to the client to terminate the upstream session (step 515). It should be noted that the command to terminate the upstream session may include a further command to terminate one or more further upstream sessions. Accordingly, each data processing system in the chain may strip off, for example, a tilde from the fast exit command and pass the remaining characters to each respective client upstream from it. A client application on a data processing system may exchange information with a server application hosted on the same server in order to communicate the modified user command. Accordingly, the client application can be a conduit to transferring a user command to a server application managing the upstream session at step 510.

In contrast, a negative determination at step 511 may result in the server merely closing the telnet session to the client (step 513). Step 513 may be performed without any attendant passing of further commands to the client of the server. Accordingly, after execution of steps 513 or 515, the server may terminate processing.

A positive determination at step 511 is a determination that a residual request to terminate is present in the user command. A residual request to terminate is a request to terminate at least one session that is upstream from the session served by the server. The residual request to terminate can be processed further within the flowchart of a client, for example at step 413 of FIG. 4.

Figure 6:
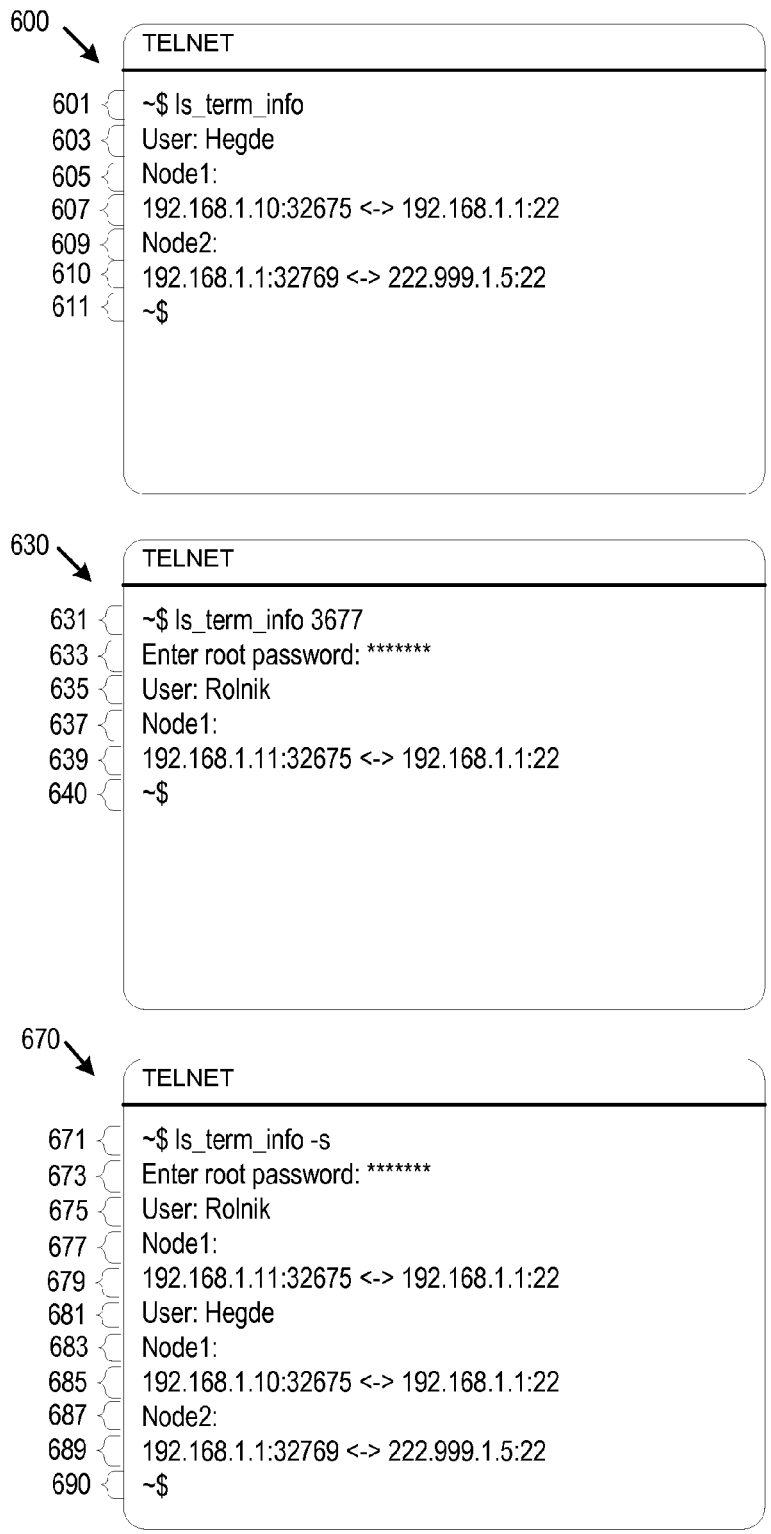
FIG. 6 is a set of exemplary interactive shells rendered by a server to a client in accordance with an illustrative embodiment of the invention.

FIG. 6 is a set of exemplary interactive shells rendered by a server to a client in accordance with an illustrative embodiment of the invention. In each shell, which may be depicted as a window in the user's client computer, a prompt is provided as "~$". Each interactive shell can be executed locally to a most remote server to the client in a chain of nested sessions. Accordingly, the responses depicted by shells in FIG. 6 may be those produced by Server C 215 of FIG. 2. Depicted in each screen 600, screen 630, and screen 670, is the user entered command that forms the upstream session request, as well as responses by the server to account for one or more nested sessions. The user may use a pre-established string to invoke an application in the server to account for nested sessions, in this case, the string or command is "ls_term_info". In addition, each of screen 600, screen 630, and screen 670 may render reports concerning one or all users that have sessions.

The upstream session request, without options, merely requests the session information, including any upstream session data for the current user making the command as shown in screen 600. For example, a user may be logged in as "Hegde". Accordingly, the upstream session request 601 is made at the command prompt. Next, the server identifies the applicable user for which upstream session request data is being provided, for example, "User: Hegde" 603. Further descriptions of the two sessions that comprise the chain of sessions are depicted. First, the server renders a first session in line 605 and line 607. Next, the server renders the second session in lines 609 and line 610. The server may provide a system prompt at line 611 for further interaction. As can be seen, the report at lines 603-610 can render a description of a client, for example, depicted at line 610 as 192.168.1.1, as well as a client to the client at line 607 as 192.168.1.10. It is recognized that each client may be described by an Internet protocol address, as well as any other suitable identifier.

Alternatively, an upstream session request may request information concerning a specific session. Accordingly, the upstream session request may specify a process identifier (PID) that is associated with a process that is a server application to a session. Screen 630 shows this situation. Accordingly, at line 631, a user expresses "ls_term_info 3677", where 3677 is the process identifier for a session executed on a server. As a way to enhance privacy, this option may be available only to users who have root privileges. Accordingly, at line 633, the user is prompted to enter a password, which may be masked with asterisks.

At line 635, the server can respond with the user identifier associated with the process identifier, in this case "User: Rolnik" Accordingly, a description of at least one session follows at line 637 and line 639. The server may provide a system prompt at line 640 for further interaction.

Still a further alternative upstream session request is shown in screen 670. The user may make an upstream session request that requests a summary of all user's sessions. The user may make the command as shown in line 671 using "ls_term_info -s". To enhance privacy, the server may prompt the user for a password at line 673. Details concerning two users are shown first at lines 675-679, and second at lines 681-689, for users "Rolnik" and "Hegde", respectively. The server may provide a system prompt at line 690 for further interaction.

Illustrative embodiments may permit a user to exit from multiple sessions by stacking or relaying requests to terminate in a manner that the remote host communicates to one or more upstream data processing systems. The request is made to the most remote shell. Accordingly, a user can close as many intermediate sessions as desired in a single command. Furthermore, the user can shorten the chain of sessions by an arbitrary number he selects.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reporting session information for a session upstream from a server, the method comprising:
   receiving, by the server, a session handshake from a first client for a first session between the server and the first client;
   receiving, by the server, a session descriptor for a second session between a second client and the first client before handling a nested session,
      wherein the session descriptor comprises a first client address and a second client address,
      wherein the nested session is between the second client and the server;
   storing, by the server, the session descriptor in an upstream data structure, the upstream data structure including information concerning each session included in the nested session;
   determining, by the server, whether a user has made an upstream session request for details concerning all sessions of the nested session between the second client and the server,
      wherein the user is associated with the second client;
   responsive to a determination that the user has made an upstream session request, obtaining, by the server, session data from the upstream data structure; and
   rendering, by the server, the session data based on the upstream session request.

2. The computer implemented method of claim 1, wherein the session descriptor comprises a source Internet protocol address, a source transport control protocol port, a destination Internet protocol address, a destination transport control protocol port, and an association with at least one additional session descriptor.

3. The computer implemented method of claim 2, further comprising:
   storing the session descriptor to a linked order data structure, wherein the session descriptor is linked to a local session descriptor comprising a first client source Internet Protocol address, a first client source transport control protocol port, a destination Internet Protocol address and a destination transport control protocol port.

4. The computer implemented method of claim 1, further comprising:
   establishing a second session between the server and an additional server;

determining whether the additional server is configured to receive session descriptors;
responsive to a determination that the additional server is configured to receive session descriptors, obtaining a local session descriptor; and
responsive to a determination that the additional server is configured to receive session descriptors, transmitting the local session descriptor.

5. The computer implemented method of claim 4, further comprising:
receiving a request to terminate the second session; and
responsive to a determination that the second session is complete, closing the second session.

6. The computer implemented method of claim 5, further comprising:
determining whether a residual request to terminate a session is present in the request to terminate the second session; and
responsive to a determination that the residual request is present, closing an upstream session.

7. The computer implemented method of claim 6, further comprising:
forwarding a second residual request to terminate to a session between a second client and the first client, wherein forwarding of the second residual request is to the second client.

8. A computer program product for reporting session information for a session upstream from a server, the computer program product comprising:
computer readable storage device having computer readable program code that, when executed by a server, performs a method comprising:
receiving, by the server, a session handshake from a first client for a first session between the server and the first client;
receiving, by the server, a session descriptor for a second session between a second client and the first client before handling a nested session,
wherein the session descriptor comprises a first client address and a second client address,
wherein the nested session is between the second client and the server;
storing, by the server, the session descriptor in an upstream data structure, the upstream data structure including information concerning each session included in the nested session;
determining, by the server, whether a user has made an upstream session request for details concerning all sessions of the nested session between the second client and the server,
wherein the user is associated with the second client;
responsive to a determination that the user has made an upstream session request, obtaining, by the server, session data from an upstream data structure; and
rendering, by the server, the session data based on the upstream session request.

9. The computer program product of claim 8, wherein the session descriptor comprises a source Internet protocol address, a source transport control protocol port, a destination Internet Protocol address, a destination transport control protocol port, and an association with at least one additional session descriptor.

10. The computer program product of claim 9, further comprising:
computer readable program code configured to store the session descriptor to a linked order data structure, wherein the session descriptor is linked to a local session descriptor comprising a first client source Internet Protocol address, a first client source transport control protocol port, a destination Internet protocol address and a destination transport control protocol port.

11. The computer program product of claim 8, further comprising:
computer readable program code configured to establish a second session between the server and an additional server;
computer readable program code configured to determine whether the additional server is configured to receive session descriptors;
computer readable program code configured to obtain a local session descriptor, responsive to a determination that the additional server is configured to receive session descriptors; and
computer readable program code configured to transmit the local session descriptor, responsive to a determination that the additional server is configured to receive session descriptors.

12. The computer program product of claim 11, further comprising:
computer readable program code configured to receive a request to terminate the second session; and
computer readable program code configured to close the second session, responsive to a determination that the second session is complete.

13. The computer program product of claim 12, further comprising:
computer readable program code configured to determine whether a residual request to terminate a session is present in the request to terminate the second session; and
computer readable program code configured to close an upstream session, responsive to a determination that the residual request is present.

14. The computer program product of claim 13, further comprising:
computer readable program code configured to forward a second residual request to terminate to a session between a second client and the first client, wherein forwarding of the second residual request is to the second client.

15. A data processing system, the data processing system including a server, comprising:
a bus;
a storage device connected to the bus, wherein computer usable code is located in the storage device;
a communication unit connected to the bus; and
a processing unit connected to the bus,
wherein the processing unit executes the computer usable code to perform a method, the method comprising:
receiving, by the server, a session handshake from a first client for a first session between the server and the first client;
receiving, by the server, a session descriptor for a second session between a second client and the first client before handling a nested session,
wherein the session descriptor comprises a first client address and a second client address,
wherein the nested session is between the second client and the server;
storing, by the server, the session descriptor in an upstream data structure, the upstream data structure including information concerning each session included in the nested session;

determining, by the server, whether a user has made an upstream session request for details concerning all sessions of the nested session between the second client and the server,
wherein the user is associated with the second client;
responsive to a determination that the user has made an upstream session request, obtaining, by the server, session data from an upstream data structure; and
rendering, by the server, the session data based on the upstream session request.

16. The data processing system claim 15, wherein the session descriptor comprises a source Internet protocol address, a source transport control protocol port, a destination Internet protocol address, a destination transport control protocol port, and an association with at least one additional session descriptor.

17. The data processing system claim 16, wherein the processing unit further executes computer usable code to store the session descriptor to a linked order data structure, wherein the session descriptor is linked to a local session descriptor comprising a first client source Internet protocol address, a first client source transport control protocol port, a destination Internet protocol address and a destination transport control protocol port.

18. The data processing system claim 15, wherein the processing unit further executes computer usable code to establish a second session between the server and an additional server; determine whether the additional server is configured to receive session descriptors; obtain a local session descriptor, responsive to a determination that the additional server is configured to receive session descriptors; and transmit the local session descriptor, responsive to a determination that the additional server is configured to receive session descriptors.

19. The data processing system claim 18, wherein the processing unit further executes computer usable code to receive a request to terminate the second session; and close the second session, responsive to a determination that the second session is complete.

20. The data processing system claim 19, wherein the processing unit further executes computer usable code to determine whether a residual request to terminate a session is present in the request to terminate the second session; and close an upstream session, responsive to a determination that the residual request is present.

21. A computer implemented method to render session data, the method comprising:
receiving, by a server, a session handshake, wherein the session handshake comprises a source Internet protocol address related to a session,
wherein the session is a nested session between a first client and the server, the nested session including two or more sessions, the two or more sessions forming a connection between the client and the server using each of one or more intermediate clients as an endpoint for each of the two or more sessions;
storing, by the server, an upstream data structure, the upstream data structure including information concerning each of the two or more sessions included in the nested session;
receiving, by the server, an upstream session request for details concerning each of the two or more sessions of the nested session between the first client and the server, wherein the upstream session request references a user of the first client;
responsive to receiving the upstream session request, obtaining, by the server, a session descriptor, wherein the session descriptor includes a description of each of the one or more intermediate clients; and
rendering, by the server, the one or more intermediate clients in a report, wherein the one or more intermediate clients are described in the session descriptor.

22. The computer implemented method of claim 21, wherein the upstream session request comprises an option to report all users that have sessions.

23. The computer implemented method of claim 22, wherein the report describes the client by an identifier, and the report describes a second client to the client.

24. The computer implemented method of claim 22, wherein the report describes the client by Internet protocol address.

25. The computer implemented method of claim 21, further comprising terminating at least one session for at least one user.

* * * * *